United States Patent
Matsuhira

(10) Patent No.: US 8,643,907 B2
(45) Date of Patent: Feb. 4, 2014

(54) IMAGE PROCESSING APPARATUS AND PROGRAM THEREFOR

(75) Inventor: Masatoshi Matsuhira, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 474 days.

(21) Appl. No.: 13/087,925

(22) Filed: Apr. 15, 2011

(65) Prior Publication Data

US 2011/0255135 A1 Oct. 20, 2011

(30) Foreign Application Priority Data

Apr. 15, 2010 (JP) ................... 2010-093751

(51) Int. Cl.
*H04N 1/40* (2006.01)

(52) U.S. Cl.
USPC .......................................... 358/3.23; 345/27

(58) Field of Classification Search
None
See application file for complete search history.

(56) References Cited

U.S. PATENT DOCUMENTS

2004/0165081 A1 8/2004 Shibaki et al.

FOREIGN PATENT DOCUMENTS

| JP | 5-48892 A | 2/1993 |
| JP | 3153221 A | 1/2001 |
| JP | 2004-187119 A | 7/2004 |
| JP | 2009-21915 A | 1/2009 |

*Primary Examiner* — Twyler Haskins
*Assistant Examiner* — Christopher D Wait
(74) *Attorney, Agent, or Firm* — Nutter McClennen & Fish LLP; John J. Penny, Jr.

(57) ABSTRACT

In the case of a text mode, a text LUT is stored by using the number Nt1 of first text grid cells so that the storage size does not exceed the amount of free space of an integrated RAM. In the case of a photograph mode, or in the case of a mixed text-and-photograph mode and special paper being used as paper, a photograph LUT is stored by using the number Np1 of first photograph grid cells so that the storage size does not exceed the amount of free space of the integrated RAM. In the case of a mixed text-and-photograph mode and plain paper being used as paper, the photograph LUT is stored so that the total of storage sizes of the photograph LUT and the text LUT does not exceed the amount of free space of the integrated RAM.

7 Claims, 6 Drawing Sheets

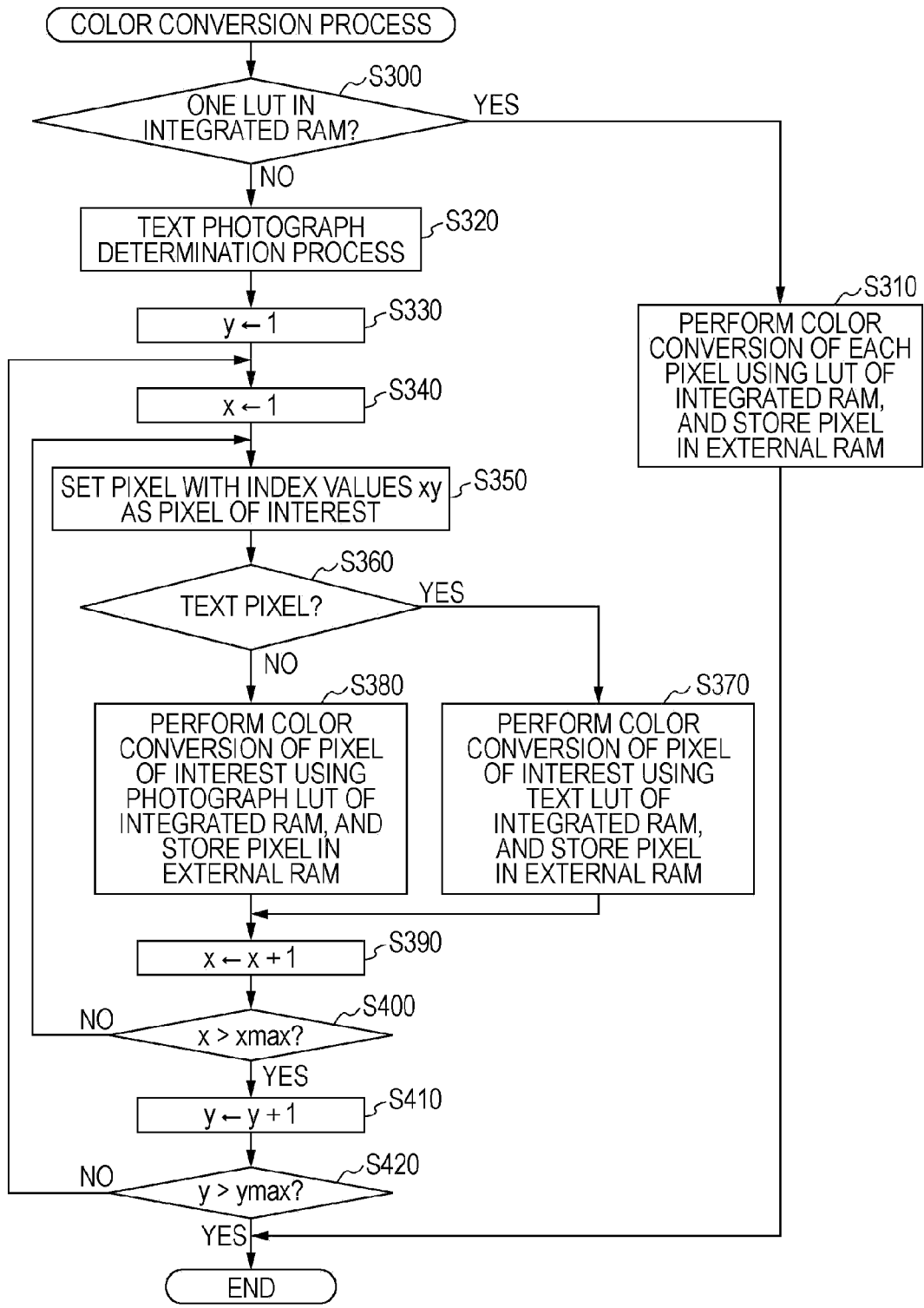

IMAGE PROCESSING APPARATUS AND PROGRAM THEREFOR

BACKGROUND

1. Technical Field

The present invention relates to an image processing apparatus and a program therefor.

2. Related Art

There has been proposed an image processing apparatus that, in a high-speed mode, decreases the number of grid cells in a look up table (LUT) used for color conversion is decreased, and then stores the LUT in a storage unit whose storage capacity is small and whose access speed is high, and, in a high-quality mode, increases the number of grid cells in the LUT, and then stores the LUT in a storage unit whose storage capacity is large and whose access speed is low (e.g., see JP-A-2009-21915).

In the image processing apparatus disclosed in JP-A-2009-21915, one LUT is always used for one piece of image data although the number of grid cells in the LUT is adjusted. However, it is conceivable that color conversion is performed for one piece of image data using LUTs that differ among pixels. Such a case is not taken into consideration in JP-A-2009-21915. Here, storage units with high access speeds are high in cost, and therefore many of them have relatively small storage capacities. Accordingly, although an image processing apparatus may attempt to store a plurality of LUTs in a storage unit with a high access speed in the same way as with only one LUT, there is sometimes a lack of storage capacity.

SUMMARY

An advantage of some aspects of the invention is that, regardless of whether one LUT or two LUTs are used, the LUT or LUTs are stored in a storage unit whose access speed is high and whose storage capacity is relatively small.

To attain the advantage mentioned above, the invention employs the following.

An aspect of the invention provides an image processing apparatus including a first storage unit configured to store, as look up tables (LUTs) referred to for color conversion from a first color space to a second color space, a photograph LUT suitable for the color conversion of each photograph pixel that is each pixel in a region representing a photograph, and a text LUT suitable for the color conversion of each text pixel that is each pixel in a region representing text; a second storage unit whose access speed is higher than an access speed of the first storage unit; a use LUT determination unit configured to determine, for image data made up of a plurality of pixels and being an object of the color conversion, whether a use LUT to be used during the color conversion of the image data is the photograph LUT or the text LUT or both of the photograph LUT and the text LUT; and a storing unit. The storing unit is configured to: in a case where the use LUT is determined to be the photograph LUT, read out the photograph LUT from the first storage unit and store the photograph LUT in the second storage unit by using a number of first photograph grid cells so that a storage size of the photograph LUT does not exceed an amount of free space of the second storage unit; in a case where the use LUT is determined to be the text LUT, read out the text LUT from the first storage unit and store the text LUT in the second storage unit by using a number of first text grid cells so that a storage size of the text LUT does not exceed the amount of free space of the second storage unit; and in a case where the use LUT is determined to be both of the photograph LUT and the text LUT, store the photograph LUT and the text LUT in the second storage unit with at least one of processing of storing the photograph LUT in the second storage unit by using a number of second photograph grid cells less than the number of first photograph grid cells and processing of storing the text LUT in the second storage unit by using a number of second text grid cells less than the number of first text grid cells so that a total of storage sizes of the photograph LUT and the text LUT read out from the first storage unit does not exceed the amount of free space of the second storage unit.

In the image processing apparatus, the first storage unit stores, as look up tables (LUTs) referred to for color conversion from the first color space to the second color space, the photograph LUT suitable for the color conversion of each photograph pixel that is each pixel in a region representing a photograph, and the text LUT suitable for the color conversion of each text pixel that is each pixel in a region representing text. Then, for image data made up of a plurality of pixels and being an object of the color conversion, it is determined whether the use LUT to be used during the color conversion of the image data is the photograph LUT or the text LUT or both of the photograph LUT and the text LUT. Thereafter, in the case where the use LUT is determined to be the photograph LUT, the photograph LUT is read out from the first storage unit, and the photograph LUT is stored in the second storage unit by using the number of first photograph grid cells so that the storage size of the photograph LUT does not exceed the amount of free space of the second storage unit whose access speed is higher than the access speed of the first storage unit. Also, in the case where the use LUT is determined to be the text LUT, the text LUT is read out from the first storage unit, and the text LUT is stored in the second storage unit by using the number of first text grid cells so that the storage size of the text LUT does not exceed the amount of free space of the second storage unit. Also, in the case where the use LUT is determined to be both of the photograph LUT and the text LUT, the photograph LUT and the text LUT are stored in the second storage unit with at least one of processing of storing the photograph LUT in the second storage unit by using the number of second photograph grid cells less than the number of first photograph grid cells and processing of storing the text LUT in the second storage unit by using the number of second text grid cells less than the number of first text grid cells so that the total of storage sizes of the photograph LUT and the text LUT read out from the first storage unit does not exceed the amount of free space of the second storage unit. Therefore, in the case of using either of the photograph LUT and the text LUT for the color conversion of image data, and in the case of using both of the photograph LUT and the text LUT, appropriately adjusting the number of grid cells allows an LUT or LUTs to be stored in the second storage unit of a high access speed. In other words, regardless of whether one LUT or two LUTs are used, the LUT or LUTs can be stored in a storage unit whose access speed is high and whose storage capacity is relatively small.

In the case where the use LUT is determined to be both of the photograph LUT and the text LUT, the storing unit may be a unit configured to store the photograph LUT in the second storage unit by using the number of grid cells greater than the number of grid cells for the text LUT. In such a way, although there is a possibility that the color of a text pixel will have degradation in quality after color conversion, the color of a photograph pixel will have high quality after the color conversion, which enables the appearance of all the image data to be of high quality. This is because, in general, degradation of quality is more noticeable in photograph pixels than in text pixels.

The image processing apparatus may further include a mode setting unit configured to set any processing mode out of a photograph mode suitable for the color conversion of image data including a photograph pixel and not including a text pixel, a text mode suitable for the color conversion of image data including a text pixel and not including a photograph pixel, and a mixed text-and-photograph mode suitable for the color conversion of image data including both a photograph pixel and a text pixel. The use LUT determination unit may be a unit configured to, in a case where the photograph mode is set, determine that the use LUT is to be the photograph LUT, in a case where the text mode is set, determine that the use LUT is to be the text LUT, and, in a case where the mixed text-and-photograph mode is set, determine that the use LUT is to be both of the photograph LUT and the text LUT. In such a way, the use LUT can be appropriately determined according to the processing mode.

The use LUT determination unit may be a unit configured to determine whether the image data includes a photograph pixel and whether the image data includes a text pixel, and configured to, in a case where the image data includes the photograph pixel and does not include the text pixel, determine that the use LUT is to be the photograph LUT, in a case where the image data includes the text pixel and does not include the photograph pixel, determine that the use LUT is to be the text LUT, and in a case where the image data includes both of the photograph pixel and the text pixel, determine that the use LUT is to be both of the photograph LUT and the text LUT. In such a way, the use LUT can be appropriately determined according to the image data.

In the image processing apparatus, printing of the image data is carried out after the color conversion. The image processing apparatus may further include a paper information acquisition unit configured to acquire paper information indicating whether a type of paper as an object of the printing is special paper suitable for printing of the photograph pixel, and a color conversion unit configured to, in a case where the storing unit stores either of the photograph LUT and the text LUT in the second storage unit, perform color conversion of each pixel of the image data using the stored LUT, and, in a case where the storing unit stores the photograph LUT and the text LUT in the second storage unit, perform color conversion of each photograph pixel of the image data using the stored photograph LUT and perform color conversion of each text pixel of the image data using the stored text LUT. The storing unit may be a unit configured to, in a case where the use LUT is determined to be both of the photograph LUT and the text LUT and where the paper information indicates that the type of paper is not the special paper, store the photograph LUT and the text LUT in the second storage unit with processing of storing the photograph LUT in the second storage unit by using the number of second photograph grid cells less than the number of first photograph grid cells so that the total of storage sizes of the photograph LUT and the text LUT read out from the first storage unit does not exceed the amount of free space of the second storage unit, and, in a case where the use LUT is determined to be both of the photograph LUT and the text LUT and where the paper information indicates that the type of paper is the special paper, read out the photograph LUT from the first storage unit and store the photograph LUT in the second storage unit by using the number of first photograph grid cells so that the storage size of the photograph LUT does not exceed the amount of free space of the second storage unit. In general, in the case of printing image data on special paper suitable for printing of photograph pixels, degradation of quality of color is more noticeable in photograph pixels than that in the case of printing on another type of paper. In addition, in the case of printing on special paper, a user often places special emphasis on the quality of color of a photograph pixel rather than that of a text pixel. Here, in cases where the use LUT is determined to be both of the photograph LUT and the text LUT, if the paper type of an object of the printing is special paper, instead of and without storing the text LUT in the second storage unit, the photograph LUT is stored in the second storage unit by using the number of grid cells greater than that in cases where the paper type is any paper other than special paper. As a result, color conversion of text pixels is performed using the photograph LUT, which is less suitable for the color conversion of text pixels than the text LUT. However, high quality of the color of a photograph pixel after color conversion is achieved, which enables the appearance of all the image data after printing to be of high quality.

The first storage unit may be a unit configured to store a first photograph LUT in which a number of grid cells is the number of first photograph grid cells and a second photograph LUT in which the number of grid cells is the number of second photograph grid cells, as the photograph LUT, and store a first text LUT in which the number of grid cells is the number of first text grid cells and a second text LUT in which the number of grid cells is the number of second text grid cells, as the text LUT. The storing unit may be a unit configured to perform storing of the photograph LUT in the second storage unit by using the number of first photograph grid cells by reading out the first photograph LUT from the first storage unit and storing the first photograph LUT in the second storage unit, perform storing of the photograph LUT in the second storage unit by using the number of second photograph grid cells by reading out the second photograph LUT from the first storage unit and storing the second photograph LUT in the second storage unit, perform storing of the text LUT in the second storage unit by using the number of first text grid cells by reading out the first text LUT from the first storage unit and storing the first text LUT in the second storage unit, and perform storing of the text LUT in the second storage unit by using the number of second text grid cells by reading out the second text LUT from the first storage unit and storing the second text LUT in the second storage unit. In such a way, it is only necessary to read out an appropriate LUT of LUTs stored in advance in the first storage unit and store the LUT in the second storage unit. This eliminates the necessity for changing the number of grid cells of the LUT.

Another aspect of the invention provides a program for causing a computer to function as any one of the foregoing image processing apparatuses. The program may be recorded on a computer-readable recording medium (e.g., a hard disk, a ROM, a FD, a CD or a DVD), may also be delivered from one computer to another via a transmission medium (a communication network such as the Internet or a LAN), and may further be exchanged in any other form. When the program is executed by a computer, the computer functions as the image processing apparatus according to any one of the foregoing aspect of the invention, and therefore the same advantage as the image processing apparatus according to the aspect of the invention can be obtained.

BRIEF DESCRIPTION OF THE DRAWINGS

The invention will be described with reference to the accompanying drawings, wherein like numbers reference like elements.

FIG. 6 is a flowchart illustrating an exemplary color conversion process.

DESCRIPTION OF EXEMPLARY EMBODIMENT

Figure 1:
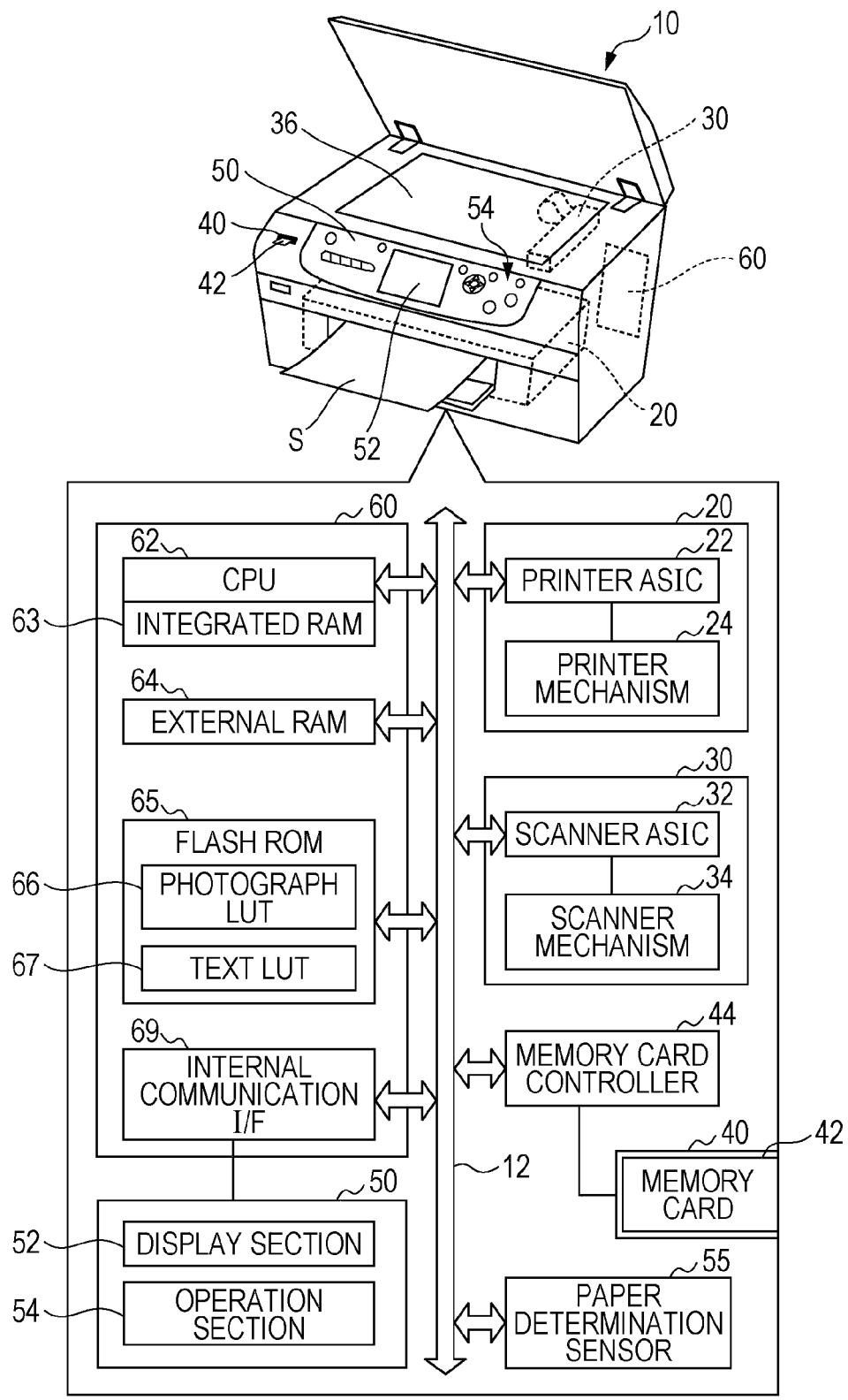
FIG. 1 schematically illustrates a configuration of a printer.

An embodiment of the invention will now be described with reference to the accompanying drawings. FIG. 1 schematically illustrates a configuration of a printer 10 that is an image processing apparatus according to an embodiment of the invention. The printer 10 of this embodiment is configured as a multifunction printer having a printer function, a scanner function and a copier function. The printer 10, as illustrated, includes a printer unit 20 that carries out printing on paper S on the basis of image data, a scanner unit 30 that reads an original document placed on a glass plate 36, a memory card controller 44 that inputs and outputs a file with stored data to and from a memory card 42 inserted into a memory card slot 40, an operation panel 50 that displays various information on a display section 52 and inputs a user's instructions through operation of a group of buttons 54, a paper determination sensor 55 that determines the type of the paper S, and a main controller 60 that is responsible for control of the entire apparatus. It is to be noted that the printer unit 20, the scanner unit 30, the memory card controller 44, the paper determination sensor 55 and the main controller 60 are designed to be able to exchange various control signals and data via a bus 12.

The printer unit 20 includes a printer application-specific integrated circuit (ASIC) 22 and a printer mechanism 24. The printer ASIC 22 is an integrated circuit for controlling the printer mechanism 24, and, upon receiving a print command from the main controller 60, the printer ASIC 22 controls the printer mechanism 24 to print an image on the paper S on the basis of image data functioning as an object of the print command. The printer mechanism 24 is also configured as a color printer mechanism used in a well-known ink jet method that discharges ink of each color of cyan (C), magenta (M), yellow (Y) and black (K) from the print head onto the paper S to perform printing.

The scanner unit 30 includes a scanner ASIC 32 and a scanner mechanism 34. The scanner ASIC 32 is an integrated circuit for controlling the scanner mechanism 34, and, upon receiving a read command from the main controller 60, the scanner ASIC 32 controls the scanner mechanism 34 to read an original document placed on the glass plate 36 as image data. The scanner mechanism 34 is configured as a well-known image scanner, and includes a well-known color image sensor that separates reflected light obtained after emission toward the original document into colors of red (R), green (G) and blue (B), thereby obtaining image data.

The memory card controller 44 is configured to input and output data from and to the memory card 42 inserted into the memory card slot 40. When the memory card 42 is connected to the memory card slot 40, the memory card controller 44 reads out a file stored in the memory card 42 and transmits the file to the main controller 60, and inputs an instruction from the main controller 60 and stores the file in the memory card 42 on the basis of the instruction.

The operation panel 50 is a device with which a user inputs various instructions to the printer 20. The operation panel 50 is provided with a display section 52 made of a color liquid crystal panel, on which text and images are displayed according to various instructions, and the operation section 54 for performing various operations. Arranged in the operation section 54 are cursor keys that are pressed down when a user moves a cursor for selecting processing, a character and the like, and a decision key that is pressed down when a user decides processing selection, and the like.

The paper determination sensor 55 is a sensor that applies light to the paper S placed on a paper tray (not illustrated), and determines the type of the paper S on the basis of the intensity of reflected light. In this embodiment, the paper S is assumed to be of two types: special paper (e.g., glossy paper) suitable for printing of a photograph and plain paper. It is to be noted that the paper determination sensor 55 may determine the type of the paper S on the basis of the intensity of transmitted light instead of that of reflected light, or may determine the type of the paper S in other ways.

The main controller 60 is configured as a microprocessor mainly made up of a central processing unit (CPU) 62, and includes an external random access memory (RAM) 64 that temporarily stores scan data, print data and the like, a flash read only memory (ROM) 65 that is capable of storing and erasing information and stores various processing programs and various data, various tables and the like, and an internal communication interface (I/F) 69 that enables communication with the operation panel 50. The CPU 62 is provided with an integrated RAM 63 as a cache memory, and the integrated RAM 63 is made of a SRAM (Static RAM). The external RAM 64 is made of a SDRAM (Synchronous Dynamic RAM). The capacity of the integrated RAM 63 (e.g., several tens of kilobytes) is smaller than that of the external RAM 64 (e.g., several hundred megabytes). It is to be noted that the access speed of the integrated RAM 63 is sufficiently larger (e.g., ten times or more) than the access speed of the external RAM 64, and the access speed of the external RAM 64 is sufficiently larger (e.g., ten times or more) than the access speed of the flash ROM 65. A photograph LUT (Look Up Table) 66 and a text LUT 67 for color conversion of each pixel of image data are stored in the flash ROM 65. The main controller 60 inputs various operation signals and various detection signals from the printer unit 20, the scanner unit 30 and the memory card controller 44, inputs paper information from the paper determination sensor 55 indicating whether the paper S is special paper or plain paper, and inputs an operation signal generated in response to the operation of the group of buttons 54 of the operation panel 50. The main controller 60 also outputs, to the memory card controller 44, a read-out command for reading out a file from the memory card 42 and outputting the file to the main controller 60, outputs a print command to the printer unit 20 so that the printer unit 20 carries out printing of image data, outputs a read command to the scanner unit 30 so that the scanner unit 30 reads an original document placed on the glass plate 36 as image data on the basis of a scan direction given using the group of buttons 54 of the operation panel 50, and outputs a control command for the display section 52 to the operation panel 50.

Here, the photograph LUT 66 and the text LUT 67 are described. Each of the photograph LUT 66 and the text LUT 67 is a table that allows each pixel of image data to be converted from an RGB color space to a CMYK color space. The photograph LUT 66 is suitable for color conversion of photograph pixels that are pixels in a region where a photograph is represented (e.g., pixels representing an image obtained by capturing an image with a digital camera or an image obtained by capturing a silver halide photograph with the scanner mechanism 34) among pixels of image data, and is configured to allow, for example, color conversion with importance placed on color reproduction. The text LUT 67 is suitable for color conversion of text pixels that are pixels in a region where text is represented, among pixels of image data, and is configured to allow, for example, color conversion with importance placed on making vivid pure colors that are likely to be used for text and making differences in color among colors. It is to be noted that the number of cells in the grid of the photograph LUT 66 stored in the flash ROM 65 is a predetermined number Mp (e.g., a value of 15) of photograph storage grid cells, and the number of grid cells of the text LUT 67 is a predetermined number Mt of text storage grid cells (e.g., a value of 15).

Next, a description will be given of operation of the printer 10 of this embodiment configured as described above. First, a print mode setting process for setting a print mode will be described. In the printer 10, any of the following modes can be set as the print mode and printing is performed: a photograph mode suitable for printing image data representing a photograph, a text mode suitable for printing image data representing text, and a mixed text-and-photograph mode suitable for printing image data in which text and a photograph are mixed. The print mode setting process is performed, for example, as follows. First, when the CPU 62 displays a print image setting screen (not illustrated) on the display section 52, a user's selection of image data to be printed is received through the operation section 54. Subsequently, the CPU 62 causes a print mode setting screen (not illustrated) to be displayed on the display section 52 and receives an instruction for selecting and determining which of the "photograph mode", the "text mode" and the "mixed text-and-photograph mode" displayed on the screen through the operation section 54 from the user. The CPU 62 sets the print mode by storing the received print mode in a predetermined region of the external RAM 64.

Figure 2:
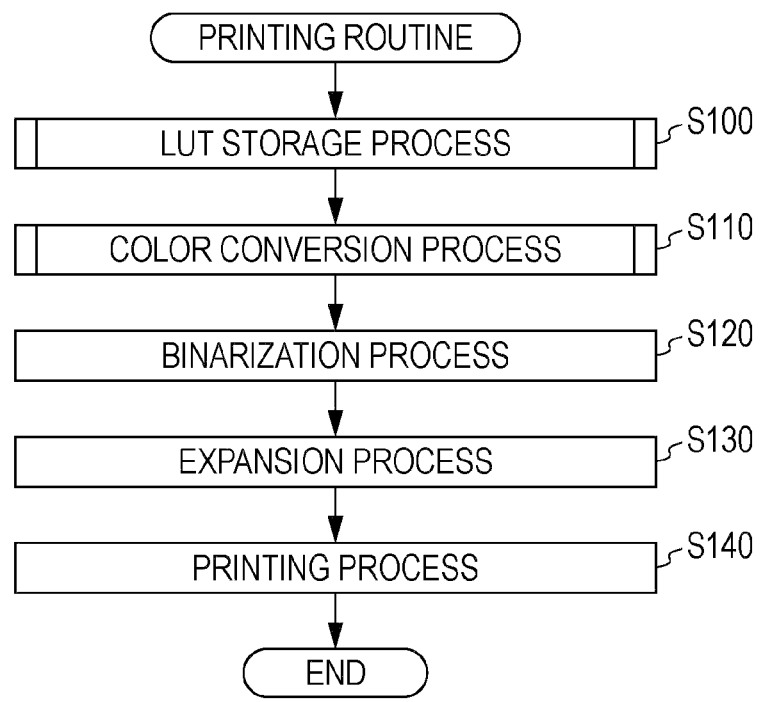
FIG. 2 is a flowchart illustrating an exemplary printing routine.

Subsequently, a description will be given of the operation of converting the image data to be printed, which has been selected by a user, into print data capable of being printed with the printer mechanism 24, and performing printing on the paper S. FIG. 2 is a flowchart illustrating an exemplary printing routine executed by the CPU 62 of the main controller 60. This routine is executed when, after the image data is selected and the print mode is selected and determined by performing of the aforementioned print mode setting process, a user operates the operation section 54 to give an instruction for starting printing. There is described below processing in which when the user selects image data (RGB data) made up of pixels of the RGB color space stored in the memory card 42 as an object to be printed, color conversion of the image data into image data (CMYK data) made up of pixels of the CMYK color space is performed and printing is performed. It is to be noted that, with respect to image data (RGB data and CMYK data), pixels are arranged in longitudinal and lateral directions in a matrix, and the value of each color in the arranged pixels is expressed in the range from 0 to 255 of 256-level gray scale (8 bits) according to light and shade.

When the printing routine starts, the CPU 62 first performs a LUT storage process in which the CPU 62 reads out the photograph LUT 66 and the text LUT 67 stored in the flash ROM 65 as needed and stores them in the integrated RAM 63 (step S100), and then the CPU 62 performs a color conversion process in which each pixel of image data selected by a user is converted from an RGB color space (8 bits per color) to a CMYK color space (8 bits per color) using the LUT stored in the integrated RAM 63 (step S110). Subsequently, the CPU 62 performs a binarization process that converts image data made of the resulting pixels in CMYK colors into binary-converted data of CMYK (2 bits per color), for example, using a dither method (step S120), and the CPU 62 expands the binary-converted data in the order in which the print head of the printer mechanism 24 forms dots, so that print data as an object of a print command is generated (step S130). Then, the CPU 62 outputs the generated print data together with the print command to the printer unit 20, then the printer ASIC 22 receives the print command and controls the printer mechanism 24 to print an image based on the print data on the paper S (step S140), and thus this routine ends. Hereinbelow, the LUT storage process in step S100 and the color conversion process in step S110 will be described in sequence.

Figure 3:
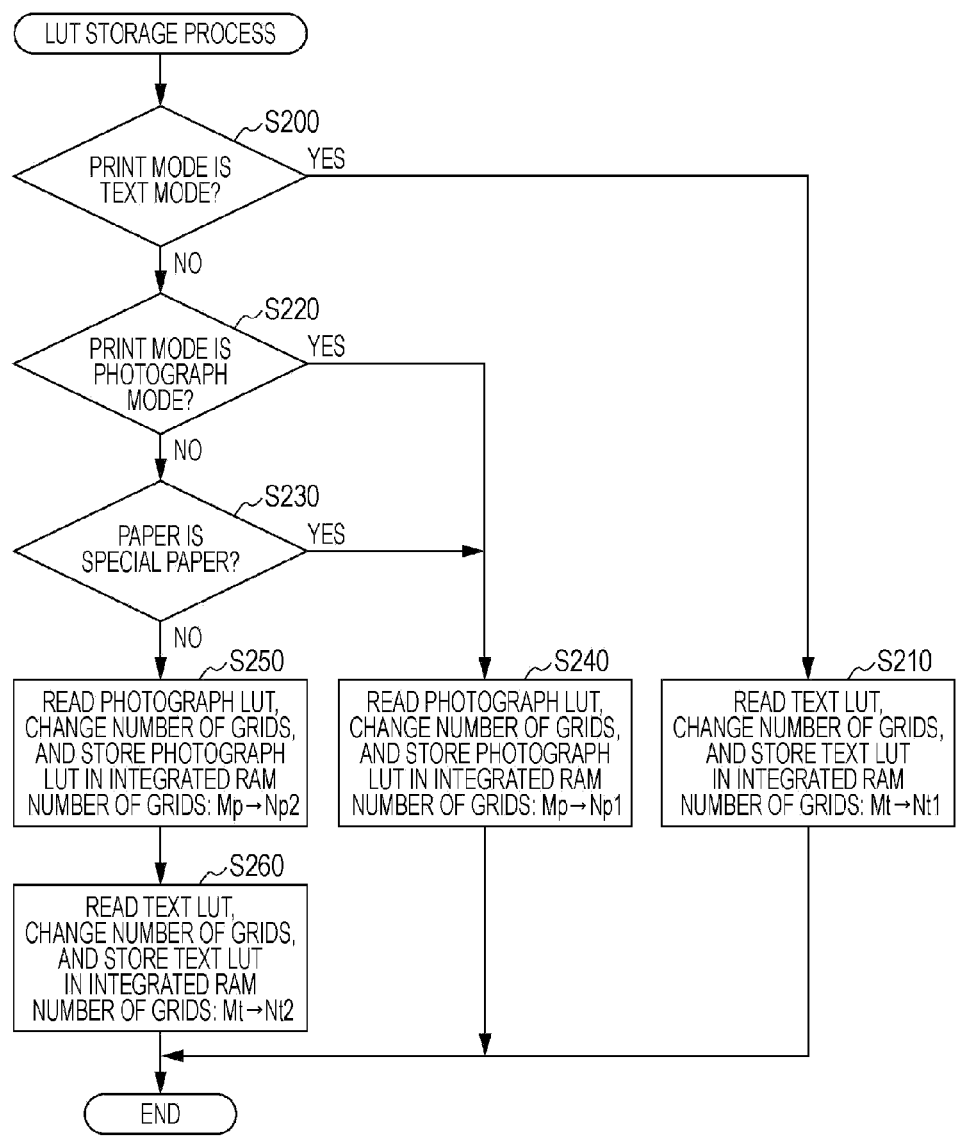
FIG. 3 is a flowchart illustrating an exemplary LUT storage process.

First, the LUT storage process in step S100 will be described. FIG. 3 is a flowchart illustrating an exemplary LUT storage process. In the LUT storage process, the CPU 62 first examines whether the print mode stored in the external RAM 64 is the text mode (step S200). If the determination is affirmative, then the CPU 62 reads out the text LUT 67 from the flash ROM 65, changes the number of grid cells from the number Mt of text storage grid cells to the number Nt1 of first text grid cells, and stores the text LUT 67 in the integrated RAM 63 (step S210), and thus the LUT storage process is completed. The number Nt1 of first text grid cells is a value set as the maximum number of grid cells within such a range that the storage size of the text LUT 67 does not exceed the amount of free space of the integrated RAM 63. If the determination is affirmative in step S200, the print mode is the text mode, and therefore color conversion of image data may be performed using the text LUT 67. As a result, in step S210, only the text LUT 67 is read out, the number of grid cells of the text LUT 67 is maximized within a range not exceeding the amount of free space of the integrated RAM 63, and the text LUT 67 is stored in the integrated RAM 63. It is assumed in this embodiment that the integrated RAM 63 secures a free space of at least 20 KB, and the number Nt1 of first text grid cells is set to a value of 17 (a storage size of about 19.6 KB). It is to be noted that, in cases where each of four colors of CMYK is represented as data of 8 bits (1 byte), the value obtained by multiplying the number of grid cells raised to 3rd power by 4 is the storage size (in bytes) of a LUT.

Figure 4:
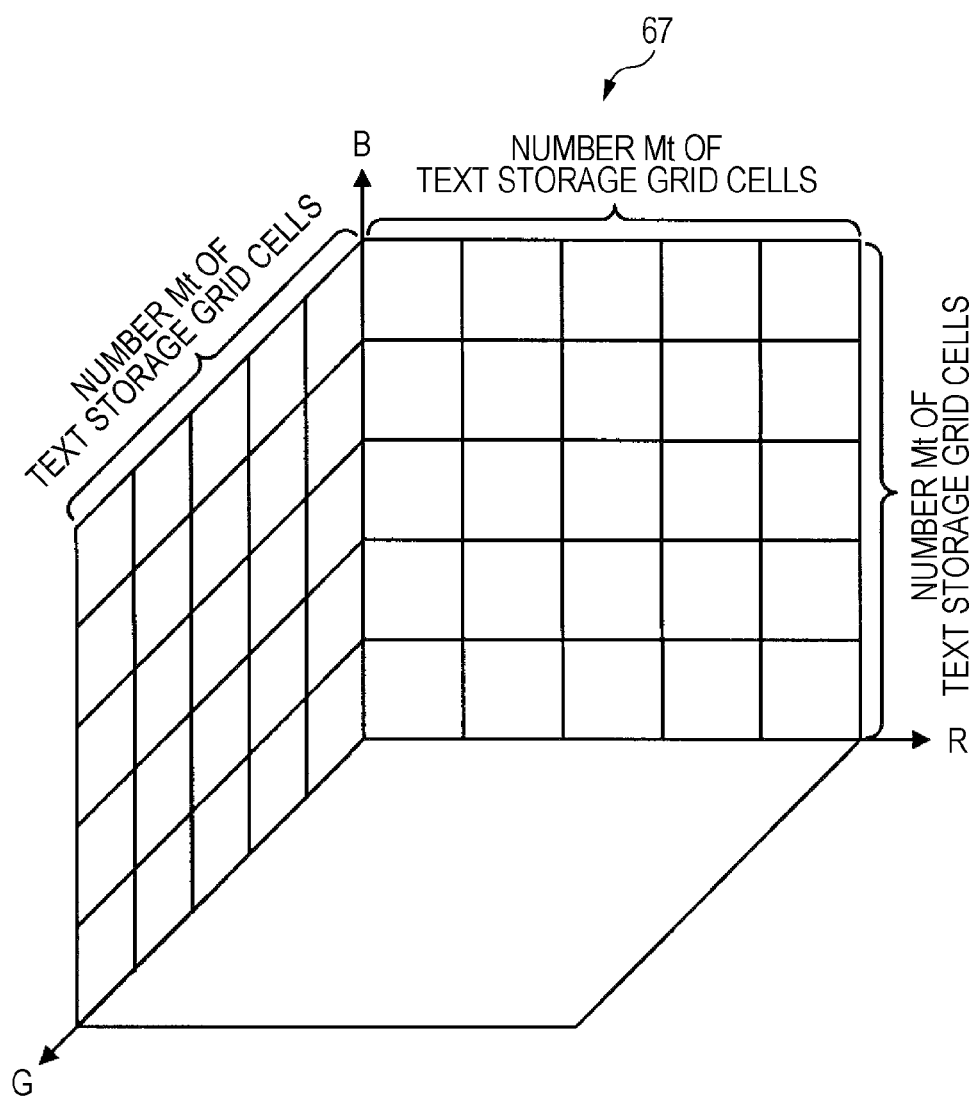
FIG. 4 is an explanatory illustration of a text LUT stored in a flash ROM.
Figure 5:
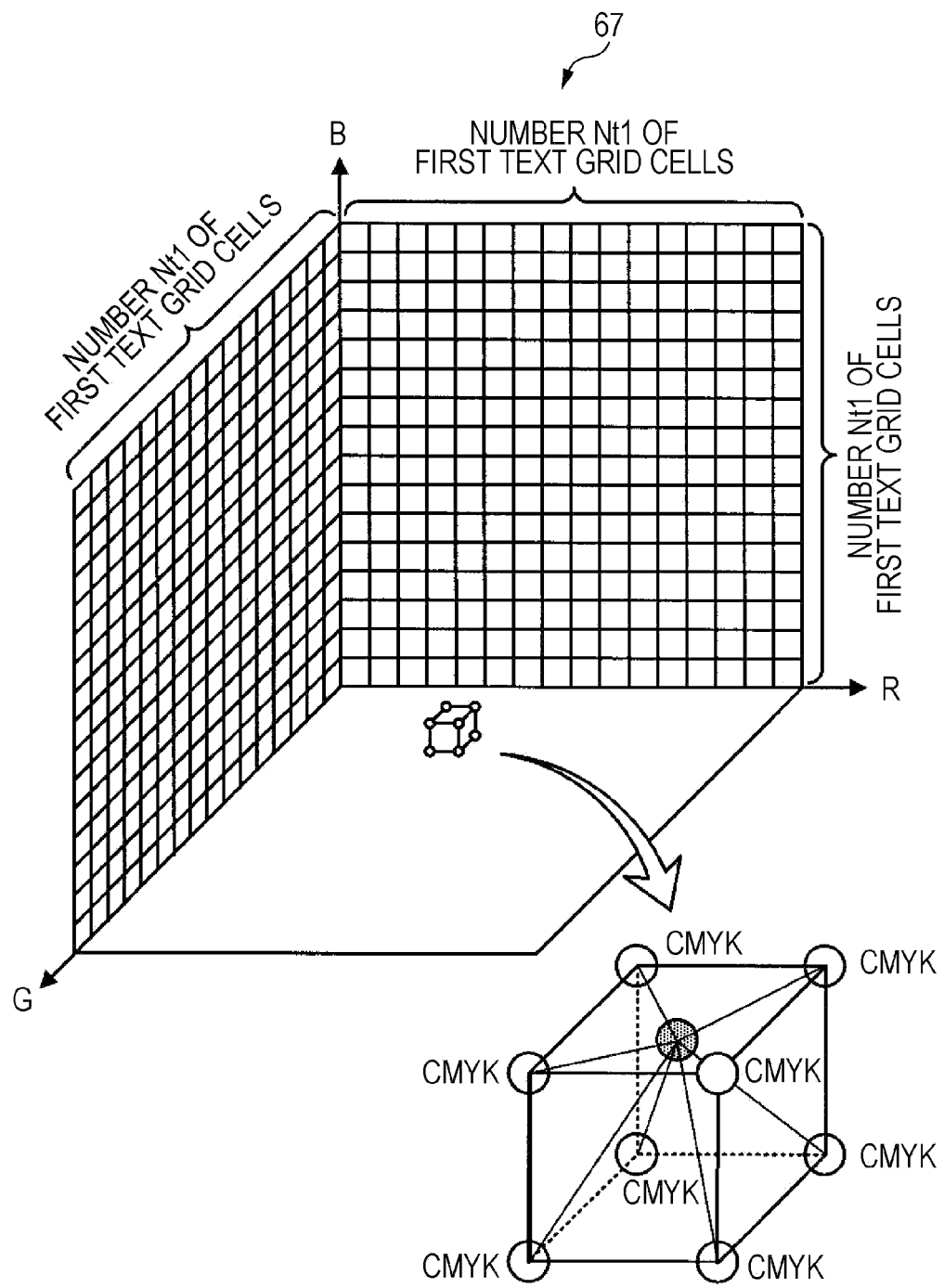
FIG. 5 is an explanatory illustration of the text LUT after the number of grid cells has been changed.

Here, processing in step S210, in which the number of grid cells of the text LUT 67 is changed from the number Mt of text storage grid cells to the number Nt1 of first text grid cells, will be described. FIG. 4 is an explanatory illustration of the text LUT 67 stored in the flash ROM 65. As illustrated in FIG. 4, the text LUT 67 has lattice point data with an R-axis, a G-axis and a B-axis of a three-dimensional RGB space each divided by the number Mt of text storage grid cells. It is to be noted that, in FIG. 4, the number of grid cells is reduced for the sake of brevity. The lattice point data is associated with the value of CMYK corresponding to the value of RGB, which allows the RGB value of a pixel included in image data to be converted into the CMYK value. When the number Nt1 of first text grid cells is greater than the number Mt of text storage grid cells, processing of increasing lattice point data (i.e., increasing the number of grid cells) is performed by interpolating data between lattice points in the text LUT 67 of FIG. 4 using well-known tetrahedral interpolation processing. FIG. 5 is an explanatory illustration of the text LUT 67 with the number of grid cells increased to the number Nt1 of first text grid cells. When the number Nt1 of first text grid cells is less than the number Mt of text storage grid cells, processing of decreasing lattice point data (i.e., decreasing the number of grid cells) is performed by reducing data of lattice points at predetermined intervals in the text LUT 67 of FIG. 4. In step S210, increasing or decreasing the number of grid cells in the LUT in such a manner changes the number of grid cells in the text LUT 67 from the number Mt of text storage grid cells to the number Nt1 of first text grid cells, and the text LUT 67 is stored in the integrated RAM 63. It is to be noted that the number Nt1 of first text grid cells and the number Mt of text storage grid cells have the same value, increasing or decreasing the number of grid cells is unnecessary, and, as a result, in step S210, the CPU 62 reads out the text LUT 67 stored in the flash ROM 65 and then stores the text LUT 67 in the integrated RAM 63 without the text LUT 67 being changed.

On the other hand, if the determination is negative in step S200, then the CPU 62 examines whether the print mode stored in the external RAM 64 is the photograph mode (step S220). If the determination is negative, then the CPU 62 determines whether the paper S is special paper, on the basis of paper information input from the paper determination sensor 55 (step S230). If the determination is affirmative in step S220 or if the determination is negative in step S230, then the CPU 62 reads out the photograph LUT 66 from the flash ROM 65, changes the number of grid cells from the number Mp of photograph storage grid cells to the number Np1 of first photograph grid cells, and stores the photograph LUT 66 in the integrated RAM 63 (step S240), and thus the LUT storage process is completed. The number Np1 of first photograph grid cells is a value set as the maximum number of grid cells within such a range that the storage size of the photograph LUT 66 does not exceed the amount of free space of the integrated RAM 63. If the determination is affirmative in step S220, the print mode is the photograph mode, and therefore color conversion of image data may be performed using the photograph LUT 66. As a result, in step S240, only the photograph LUT 66 is read out, the number of grid cells of the photograph LUT 66 is maximized within a range not exceeding the amount of free space of the integrated RAM 63, and the photograph LUT 66 is stored in the integrated RAM 63. It is to be noted that the reason why, if the determination is affirmative in step S230, that is, if the print mode is the mixed text-and-photograph mode but the paper S is special paper, only the photograph LUT 66 is stored in the integrated RAM 63 in step S240 is as follows. If the type of the paper S is special paper, degradation in quality of color of a photograph pixel is more noticeable than that in the case of printing on plain paper. In addition, in the case of printing on special paper, a user often places special emphasis on the quality of color of a photograph pixel rather than that of a text pixel. To address these issues, instead of and without storing the text LUT 67 in the integrated RAM 63, the number of grid cells of the photograph LUT 66 is changed to the maximum number of grid cells within a range not exceeding the amount of free space of the integrated RAM 63, and the photograph LUT 66 is stored in the integrated RAM 63, which gives a higher priority to achievement of high quality of the color of a photograph pixel after color conversion. As a result, although color conversion of a text pixel is also performed using a photograph LUT in the color conversion process to be described later, high quality is achieved for the color of a photograph pixel after color conversion, which enables the appearance of all the image data printed on the paper S to be of high quality. In this embodiment, the number Np1 of first photograph grid cells is assumed to be set to a value of 17, which is the same as the number Nt1 of first text grid cells. It is to be noted that, the processing in step S240 of changing the number of grid cells of the photograph LUT 66 from the number Mp of photograph storage grid cells to the number Np1 of first photograph grid cells is performed in the same manner as the aforementioned step S210.

If the determination is negative in step S230, then the CPU 62 reads out the photograph LUT 66 from the flash ROM 65, changes the number of grid cells from the number Mp of photograph storage grid cells to the number Np2 of second photograph grid cells, and stores the photograph LUT 66 in the integrated RAM 63 (step S250). Then, the CPU 62 reads out the text LUT 67, changes the number of grid cells from the number Mt of text storage grid cells to the number Nt2 of second text grid cells, and stores the text LUT 67 in the integrated RAM 63 (step S260), and thus the LUT storage process is completed. Here, the number Np2 of second photograph grid cells and the number Nt2 of second text grid cells are values set in such a manner that the total of the storage size of the photograph LUT 66 and the storage size of the text LUT 67 does not exceed the amount of free space of the integrated RAM 63. Also, the number Np2 of second photograph grid cells is set to be greater than the number Nt2 of second text grid cells. If the determination is negative in step S230, the print mode is the mixed text-and-photograph mode and the paper S is plain paper, and therefore color conversion of text pixels and photograph pixels may be performed using LUTs suitable for the text pixels and the photograph pixels, respectively. Accordingly, both the photograph LUT 66 and the text LUT 67 with the numbers of grid cells not exceeding the amount of free space of the integrated RAM 63 are stored in the integrated RAM 63. It is to be noted that the reason why the number Np2 of second photograph grid cells is made greater than the number Nt2 of second text grid cells is that, in general, degradation of quality is more noticeable in photograph pixels than in text pixels, and therefore, the higher the number of grid cells of the photograph LUT 66, the higher can be the quality of the appearance of all the image data after color conversion. In this embodiment, the number Np2 of second photograph grid cells is assumed to be set to a value of 16 (the storage size of the photograph LUT 66 is about 16.4 KB), which is less than the number Np1 of first photograph grid cells, and the number Nt2 of second text grid cells is assumed to be set to a value of 9 (the storage size of the text LUT 67 is about 2.9 KB), which is less than the number Nt1 of first text grid cells. It is to be noted that, in steps S250 and S260, the numbers of grid cells of the photograph LUT 66 and the text LUT 67 are changed in the same manner as in the aforementioned step S210.

Next, the color conversion process in step S110 will be described. FIG. 6 is a flowchart illustrating an exemplary color conversion process. In the color conversion process, the CPU 62 first determines whether one LUT is stored in the integrated RAM 63 (step S300). The determination is assumed as follows. For example, if processing of step S210 or processing of step S240 is performed in the LUT storage process, the determination is affirmative, whereas if processing of steps S250 and S260 is performed, the determination is negative. It is to be noted that the determination may be made by actually examining the LUT stored in the integrated RAM 63. If the determination is affirmative, then the CPU 62 performs color conversion of all pixels of image data from the RGB color space to the CMYK color space using the LUT stored in the integrated RAM 63, and stores the pixels in the external RAM 64 (step S310), and thus the color conversion process is completed. It is to be noted that, at the time of color conversion of pixels using the LUT, when the RGB value (shaded sphere) of a pixel is displaced from lattice point data (white spheres) as illustrated in FIG. 5, the CMYK value is calculated on the basis of the distance between a lattice point that is each vertex of the minimum lattice in which the RGB value of the pixel is stored and a point of RGB of the pixel.

On the other hand, if the determination is negative in step S300, then the CPU 62 performs a text photograph determination process that determines for image data selected by a user whether each pixel of the image data is a photograph pixel or a text pixel (step S320). The determination is made, for example, by performing edge region detection, dots region detection, white background region detection and achromatic/chromatic region detection for the image data to identify a text region, and determining pixels included in the text region as text pixels and pixels included in all other regions as photograph pixels. Such identification of the text region is disclosed in, for example, JP-A-2004-187119, Japanese Pat. No. 3,153,221 and JP-A-5-48892.

Subsequently an index value y is set to a value of 1 (step S330) and an index value x is set to a value of 1 (step S340), and a pixel corresponding to the index values xy is set as a pixel of interest (step S350). The index values xy as used herein are used as values indicating position coordinates of pixels arranged in a matrix in the image data, and each of the index values x and y of a pixel located at the top left in image data is set to a value of 1, the right direction is set as an x direction, and the down direction is set as a y direction. Next, it is determined whether the set pixel of interest is a text pixel (step S360). The determination is made on the basis of the result of the text photograph determination process in step S320. If the determination is affirmative, then the CPU 62 performs color conversion of each pixel of image data from the RGB color space to the CMYK color space using the text LUT 67, in which the number of grid cells stored in the integrated RAM 63 is the number Nt2 of second text grid cells, and stores the pixels in the external RAM 64 (step S370). On the other hand, if the determination is negative, then the CPU 62 performs color conversion of pixels of the image data from the RGB color space to the CMYK color space using the photograph LUT 66, in which the number of grid cells stored in the integrated RAM 63 is the number Np2 of second photograph grid cells, and stores the pixels in the external RAM 64 (step S380). In such a manner, color conversion is performed using the text LUT 67 if the pixel of interest is a text pixel, and color conversion is performed using the photograph LUT 66 if the pixel of interest is a photograph pixel. It is to be noted that, also in color conversion in steps S370 and S380, like in step S310, when the RGB value of the pixel is displaced from lattice point data, the CMYK value is calculated on the basis of the distance between a lattice point that is each vertex of the minimum lattice in which the RGB value of the pixel is stored and a point of RGB of the pixel.

Upon performing processing of step S370 or step S380, the CPU 62 increments the index value x by a value of 1 (step S390), and determines whether the incremented index value x exceeds a maximum value xmax (step S400). It is to be noted that the maximum value xmax is a value of the index value x of a pixel located farthest to the right in image data selected by a user. If the determination is negative in step S400, the CPU 62 returns to step S350 and repeats processing. On the other hand, if the determination is affirmative in step S400, the CPU 62 increments the index value y by a value of 1 (step S410), and determines whether the incremented index value y exceeds a maximum value ymax (step S420). It is to be noted that the maximum value ymax is a value of the index value y of a pixel located lowermost in the image data selected by the user. If the determination is negative in step S420, the CPU 62 returns to step S340 and repeats processing, whereas if the determination is affirmative in step S420, the CPU 62 determines that color conversion for all pixels of image data has been finished, and thus the color conversion process is completed.

Here, the correspondence between elements of this embodiment and elements of the invention will be clarified. The flash ROM 65 of the embodiment corresponds to the "first storage unit" of the invention, the integrated RAM 63 corresponds to the "second storage unit", the CPU 62 that performs processing of steps S200 and S220 in the LUT storage process of FIG. 3 corresponds to the "use LUT determination unit", the CPU 62 that performs processing of step S210 and steps S230 to S260 in the LUT storage process of FIG. 3 corresponds to the "storing unit", the CPU 62 that performs the print mode setting process corresponds to the "mode setting unit", the CPU 62 that inputs paper information from the paper determination sensor 55 in step S230 in the LUT storage process of FIG. 3 corresponds to the "paper information acquisition unit", and the CPU 62 that performs the color conversion process of FIG. 6 corresponds to the "color conversion unit".

With the printer 10 of this embodiment described above in detail, for image data made up of a plurality of pixels and being an object of color conversion, whether the LUT to be used during color conversion of the image data is the photograph LUT 66 or the text LUT 67 or both of the photograph LUT 66 and the text LUT 67 is determined by whether the print mode is the photograph mode or the text mode or the mixed text-and-photograph mode. Thereafter, if the print mode is the photograph mode, or if the print mode is the mixed text-and-photograph mode but the paper S is special paper, the photograph LUT 66 is read out from the flash ROM 65, and the photograph LUT 66 is stored in the integrated RAM 63 by using the number Np1 of first photograph grid cells so that the storage size of the photograph LUT 66 does not exceed the amount of free space of the integrated RAM 63 whose access speed is higher than the flash ROM 65. If the print mode is the text mode, the text LUT 67 is read out from the flash ROM 65, and the text LUT 67 is stored in the integrated RAM 63 by using the number Nt1 of first text grid cells so that the storage size of the text LUT 67 does not exceed the amount of free space of the integrated RAM 63. If the print mode is the mixed text-and-photograph mode and the paper S is plain paper, the photograph LUT 66 is stored in the integrated RAM 63 by using the number Np2 of second photograph grid cells less than the number Np1 of first photograph grid cells, and the text LUT 67 is stored in the integrated RAM 63 by using the number Nt2 of second text grid cells less than the number Nt1 of first text grid cells, so that the total of the storage sizes of the photograph LUT 66 and the text LUT 67 read out from the flash ROM 65 does not exceed the amount of free space of the integrated RAM 63. Therefore, in cases where either of the photograph LUT 66 and the text LUT 67 is used for color conversion of image data, and in cases where both of the photograph LUT 66 and the text LUT 67 are used, appropriately adjusting the number of grid cells allows an LUT or LUTs to be stored in the integrated RAM 63 of a high access speed. In other words, regardless of whether one LUT or two LUTs are used, the LUT or LUTs can be stored in a storage unit whose access speed is high and whose storage capacity is relatively small. The LUT to be used for color conversion can be appropriately determined according to the processing mode. Moreover, in cases where the print mode is the mixed text-and-photograph mode and the paper S is special paper, instead of and without storing the text LUT in the integrated RAM 63, the photograph LUT 67 is stored in the integrated RAM 63 by using the number Np1 of first photograph grid cells, which is greater than the number Np2 of second photograph grid cells. Therefore, the appearance of all the image data can be made to have high quality after printing in the mixed text-and-photograph mode on the special paper S. Furthermore, in cases where the print mode is the mixed text-and-photograph mode and the paper S is plain paper, the photograph LUT 66 and the text LUT 67 are stored in the integrated RAM 63 by using the number Np2 of second photograph grid cells that is set to have a greater value than the number Nt2 of second text grid cells. Therefore, high quality of the color of photograph pixels after color conversion is achieved, which enables the appearance of all the image data after color conversion to be of high quality.

In addition, it is to be understood that the invention is not limited to the foregoing embodiment, and can be embodied in various forms without departing from the technical scope of the invention.

For example, in the foregoing embodiment, in steps S200 and S220, whether the LUT to be used during color conversion of image data is the photograph LUT 66 or the text LUT 67 or both of the photograph LUT 66 and the text LUT 67 is determined depending on the print mode. However, by performing the text photograph determination process in step S320 of FIG. 6 prior to the LUT storage process, the LUT used for color conversion may be determined by whether pixels of image data are all text pixels, or all photograph pixels, or include both text pixels and photograph pixels. In such a way, the LUT to be used for color conversion can be appropriately determined according to image data.

In the foregoing embodiment, in step S210 and steps S240 to S260, the number of grid cells of the LUT is changed, and the LUT is stored in the integrated RAM 63. However, the photograph LUT with the number Np1 of first photograph grid cells, the photograph LUT with the number Np2 of second photograph grid cells, the text LUT with the number Nt1 of first text grid cells and the text LUT with the number Nt2 of second text grid cells are stored in advance in the flash ROM 65, and a LUT to be used of these LUTs may be read out from the flash ROM 65 and be stored in the integrated RAM 63. In such a way, the number of grid cells need not be changed.

In the foregoing embodiment, values of the number Np1 of first photograph grid cells, the number Np2 of second photograph grid cells, the number Nt1 of first text grid cells and the number Nt2 of second text grid cells are set in advance. However, the number Np1 of first photograph grid cells, the number Np2 of second photograph grid cells, the number Nt1 of first text grid cells and the number Nt2 of second text grid cells may be derived every time in accordance with the free space of the integrated RAM 63 at the time of performing processing of step S210 and steps S240 to S260. In this case, the lower limit and the upper limit of the number of grid cells of each of the photograph LUT 66 and the text LUT 67 are determined, and the number Np1 of first photograph grid cells, the number Np2 of second photograph grid cells, the number Nt1 of first text grid cells and the number Nt2 of second text grid cells may be derived within the range specified by the lower limit and the upper limit. It is to be noted that the lower limit of the number of grid cells may be set, for example, as the minimum number of grid cells required for color conversion. Also, the upper limit of the number of grid cells may be set, for example, as the number of grid cells with which the quality of color after color conversion does not change so much when viewed by the human eye even if the number of grid cells is further increased. When the number of grid cells is derived every time a LUT is stored in the integrated RAM 63 in such a way, the LUT can be more appropriately stored in accordance with the free space of the integrated RAM 63.

In the foregoing embodiment, the print mode is set to any of the photograph mode, the text mode and the mixed text-and-photograph mode. However, the mixed text-and-photograph mode may be excluded from the choice. In this case, in the LUT storage process of FIG. 3, if the determination is negative in step S200, the CPU may proceed to step S230.

In this embodiment, the number Np2 of second photograph grid cells has a value of 16, which is less than the value of the number Np1 of first photograph grid cells, and the number Nt2 of second text grid cells has a value of 9, which is less than the value of the number Nt1 of first text grid cells. However, if at least one of a condition where the number Np2 of second photograph grid cells is less than the number Np1 of first photograph grid cells and a condition where the number Nt2 of second text grid cells is less than the number Nt1 of first text grid cells is satisfied, the number Np2 of second photograph grid cells and the number Nt2 of second text grid cells each may have any value. For example, it may be assumed that in the case where the integrated RAM 63 secures a free space of at least 23 KB, the number Np1 of first photograph grid cells, the number Np2 of second photograph grid cells and the number Nt1 of first text grid cells all have a value of 17, and the number Nt2 of second text grid cells has a value of 9.

In this embodiment, in step S230 of FIG. 3, the CPU 62 determines, on the basis of paper information input from the paper determination sensor 55, whether the paper S is special paper. However, for example, paper information input through the operation section 54 by a user is acquired, and, from this paper information, it may be determined whether the paper S is special paper.

What is claimed is:

1. An image processing apparatus comprising:
 a first storage unit configured to store, as look up tables (LUTs) referred to for color conversion from a first color space to a second color space, a photograph LUT suitable for the color conversion of each photograph pixel that is each pixel in a region representing a photograph, and a text LUT suitable for the color conversion of each text pixel that is each pixel in a region representing text;
 a second storage unit whose access speed is higher than an access speed of the first storage unit;
 a use LUT determination unit configured to determine, for image data made up of a plurality of pixels and being an object of the color conversion, whether a use LUT to be used during the color conversion of the image data is the photograph LUT or the text LUT or both of the photograph LUT and the text LUT; and
 a storing unit configured to:
  in a case where the use LUT is determined to be the photograph LUT, read out the photograph LUT from the first storage unit and store the photograph LUT in the second storage unit by using a number of first photograph grid cells so that a storage size of the photograph LUT does not exceed an amount of free space of the second storage unit;
  in a case where the use LUT is determined to be the text LUT, read out the text LUT from the first storage unit and store the text LUT in the second storage unit by using a number of first text grid cells so that a storage size of the text LUT does not exceed the amount of free space of the second storage unit; and
  in a case where the use LUT is determined to be both of the photograph LUT and the text LUT, store the photograph LUT and the text LUT in the second storage unit with at least one of processing of storing the photograph LUT in the second storage unit by using a number of second photograph grid cells less than the number of first photograph grid cells and processing of storing the text LUT in the second storage unit by using a number of second text grid cells less than the number of first text grid cells so that a total of storage sizes of the photograph LUT and the text LUT read out from the first storage unit does not exceed the amount of free space of the second storage unit.

2. The image processing apparatus according to claim 1, wherein, in the case where the use LUT is determined to be both of the photograph LUT and the text LUT, the storing unit is a unit configured to store the photograph LUT in the second storage unit by using a number of grid cells greater than a number of grid cells for the text LUT.

3. The image processing apparatus according to claim 1, further comprising a mode setting unit configured to set any processing mode out of a photograph mode suitable for the color conversion of image data including a photograph pixel and not including a text pixel, a text mode suitable for the color conversion of image data including a text pixel and not including a photograph pixel, and a mixed text-and-photograph mode suitable for the color conversion of image data including both a photograph pixel and a text pixel, wherein the use LUT determination unit is a unit configured to, in a case where the photograph mode is set, determine that the use LUT is to be the photograph LUT, in a case where the text mode is set, determine that the use LUT is to be the text LUT, and, in a case where the mixed text-and-photograph mode is set, determine that the use LUT is to be both of the photograph LUT and the text LUT.

4. The image processing apparatus according to claim 1, wherein the use LUT determination unit is a unit configured to determine whether the image data includes a photograph pixel and whether the image data includes a text pixel, and configured to, in a case where the image data includes the photograph pixel and does not include the text pixel, determine that the use LUT is to be the photograph LUT, in a case where the image data includes the text pixel and does not include the photograph pixel, determine that the use LUT is to be the text LUT, and in a case where the image data includes both of the photograph pixel and the text pixel, determine that the use LUT is to be both of the photograph LUT and the text LUT.

5. The image processing apparatus according to claim 1, printing of the image data being carried out after the color conversion, the image processing apparatus further comprising:
a paper information acquisition unit configured to acquire paper information indicating whether a type of paper as an object of the printing is special paper suitable for printing of the photograph pixel; and
a color conversion unit configured to, in a case where the storing unit stores either of the photograph LUT and the text LUT in the second storage unit, perform color conversion of each pixel of the image data using the stored LUT, and, in a case where the storing unit stores the photograph LUT and the text LUT in the second storage unit, perform color conversion of each photograph pixel of the image data using the stored photograph LUT and perform color conversion of each text pixel of the image data using the stored text LUT,
wherein the storing unit is a unit configured to, in a case where the use LUT is determined to be both of the photograph LUT and the text LUT and where the paper information indicates that the type of paper is not the special paper, store the photograph LUT and the text LUT in the second storage unit with processing of storing the photograph LUT in the second storage unit by using the number of second photograph grid cells less than the number of first photograph grid cells so that the total of storage sizes of the photograph LUT and the text LUT read out from the first storage unit does not exceed the amount of free space of the second storage unit, and, in a case where the use LUT is determined to be both of the photograph LUT and the text LUT and where the paper information indicates that the type of paper is the special paper, read out the photograph LUT from the first storage unit and store the photograph LUT in the second storage unit by using the number of first photograph grid cells so that the storage size of the photograph LUT does not exceed the amount of free space of the second storage unit.

6. The image processing apparatus according to claim 1, wherein
the first storage unit is a unit configured to store a first photograph LUT in which a number of grid cells is the number of first photograph grid cells and a second photograph LUT in which the number of grid cells is the number of second photograph grid cells, as the photograph LUT, and store a first text LUT in which the number of grid cells is the number of first text grid cells and a second text LUT in which the number of grid cells is the number of second text grid cells, as the text LUT, and
the storing unit is a unit configured to perform storing of the photograph LUT in the second storage unit by using the number of first photograph grid cells by reading out the first photograph LUT from the first storage unit and storing the first photograph LUT in the second storage unit, perform storing of the photograph LUT in the second storage unit by using the number of second photograph grid cells by reading out the second photograph LUT from the first storage unit and storing the second photograph LUT in the second storage unit, perform storing of the text LUT in the second storage unit by using the number of first text grid cells by reading out the first text LUT from the first storage unit and storing the first text LUT in the second storage unit, and perform storing of the text LUT in the second storage unit by using the number of second text grid cells by reading out the second text LUT from the first storage unit and storing the second text LUT in the second storage unit.

7. A non-transitory storage medium comprising a program stored thereon for causing a computer to function as the image processing apparatus according to claim 1.

* * * * *